United States Patent [19]

Capelle

[11] Patent Number: 5,292,240
[45] Date of Patent: Mar. 8, 1994

[54] PELLETIZER WITH CUTTING KNIFE CONTROL

[75] Inventor: Gerd Capelle, Langenhagen, Fed. Rep. of Germany

[73] Assignee: Hermann Berstorff Maschinenbau GmbH, Hanover, Fed. Rep. of Germany

[21] Appl. No.: 54,061

[22] Filed: Apr. 29, 1993

[30] Foreign Application Priority Data

May 7, 1992 [DE] Fed. Rep. of Germany ....... 4214481

[51] Int. Cl.$^5$ .................. B28B 11/16; B29B 9/00
[52] U.S. Cl. .................... 425/142; 264/142; 425/313; 425/DIG. 230
[58] Field of Search ............ 425/311, 313, DIG. 230, 425/307, 142; 264/142

[56] References Cited

U.S. PATENT DOCUMENTS

| | | | |
|---|---|---|---|
| 3,143,766 | 8/1964 | Rohn | 425/DIG. 230 |
| 3,393,425 | 7/1968 | Irving | 425/86 |
| 3,912,434 | 10/1975 | Nagahara et al. | 425/313 |
| 4,182,605 | 1/1980 | Dettmer | 425/DIG. 230 |
| 4,184,833 | 1/1980 | Buchan et al. | 425/311 |
| 4,614,307 | 9/1986 | Lauser | 425/313 |
| 4,710,113 | 12/1987 | Voight | 264/142 |
| 4,874,307 | 10/1989 | Comper et al. | 425/313 |
| 5,110,523 | 5/1992 | Guggiari | 264/142 |
| 5,190,768 | 3/1993 | Ishida et al. | 264/142 |

FOREIGN PATENT DOCUMENTS 56-148510 11/1981 Japan .................. 264/142

Primary Examiner—Jay H. Woo
Assistant Examiner—Joseph Leyson
Attorney, Agent, or Firm—Foley & Lardner

[57] ABSTRACT

An exact distance between the rotating knives and the stationary die plate of a pelletizer can be set and maintained during the entire pelletizing process. The drive shaft for the cutting beams and cutting knives can be heated or cooled and is supported on the knife side in a mobile bearing. As a result of the heating/cooling of the shaft, the shaft is allowed to extend through the mobile bearing in the direction of the knife head, whereby the distance between the die plate and the cutting knives rotating above the plate can be adjusted precisely and within the My range.

5 Claims, 2 Drawing Sheets

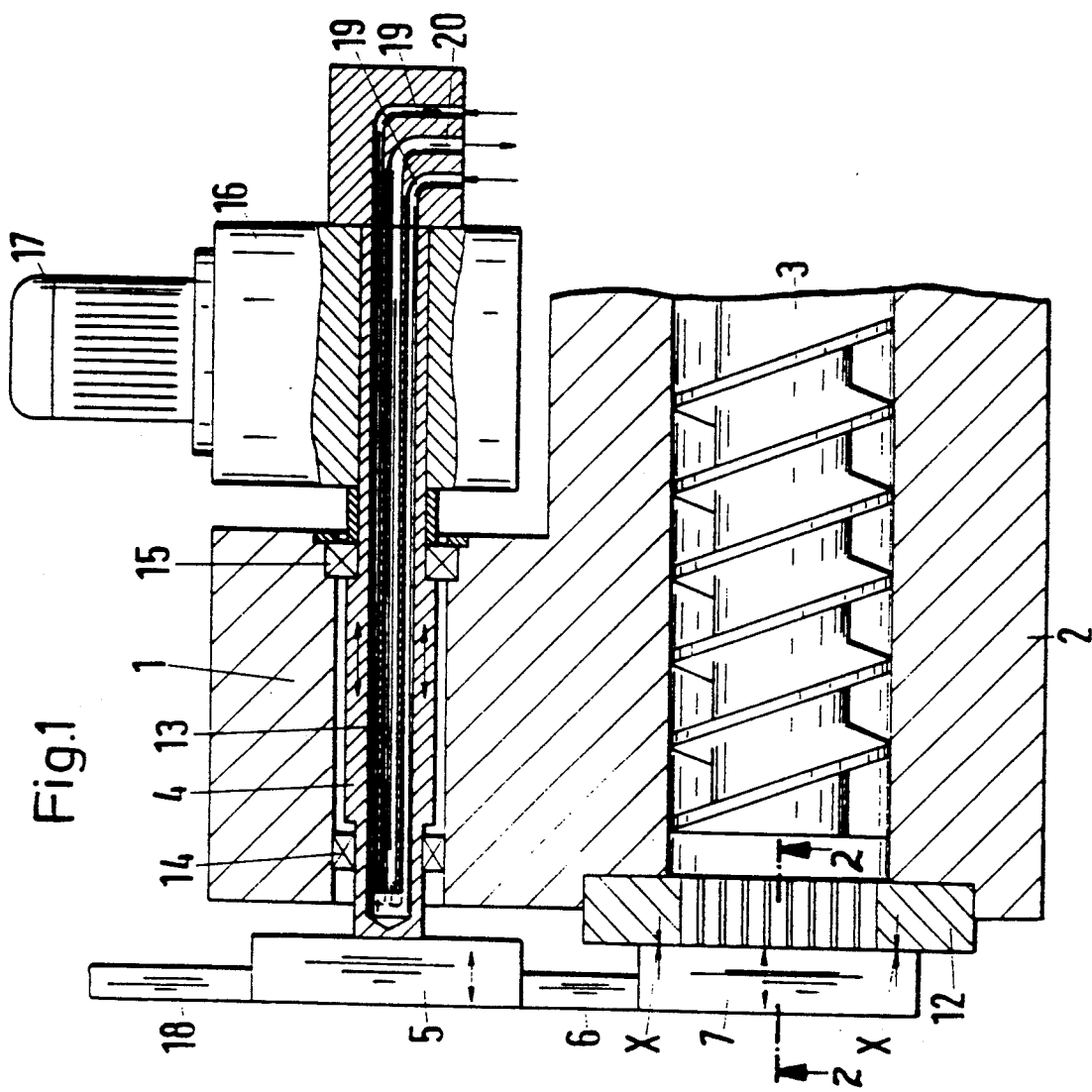

PELLETIZER WITH CUTTING KNIFE CONTROL

FIELD OF THE INVENTION

The present invention relates to a pelletizer for rubber or thermoplastic material.

BACKGROUND OF THE INVENTION

U.S. Pat. No. 3,393,425 discloses a pelletizer in which the plastic material to be pelletized is plasticized by means of an extruder, and thereafter extruded in the form of strands through a die plate. After leaving the die plate, the strands are cut into short pieces by means of rotating cutting knives arranged parallel to the die plate and cooled by means of air or a water bath in order to prevent the pellets from sticking together.

The cutting knives rotating in front of the die plate are mounted on one or several cutting beams. The cutting beams are fixed on a single central shaft that is rotated by means of a motor so that the cutting knives rotate in front of the die plate at a very small distance therefrom and cut and/or pelletize the strands leaving the die plate.

The distance between the rotating cutting, knives and the die plate must not exceed 50-150 My (0.001 mm) in order to obtain a smooth cut. If the distance is greater, the cut pellets will have beards and/or small threads that destroy the free-flowing properties and thus the possibility of metering the pellets, thus rendering a further processing of the pellets more difficult.

When the distance is too great, threads are formed at the pellets, and when it is too small, the wear of the rotating cutting knives is increased to an extent which cannot be tolerated.

SUMMARY OF THE INVENTION

The present invention seeks to provide a pelletizer of the above kind, in which the distance between the rotating cutting knives and the stationary die plate can not only be exactly set but also maintained during the entire pelletizing process. The apparatus according to the invention accomplishes this object in a simple, reliable, and easy to handle manner, and the apparatus is inexpensive to manufacture.

In accordance with the invention, the drive shaft for the cutting beams and knives is designed as a shaft that can be heated/cooled and is supported in a mobile bearing on the knife side. Linear expansion of the shaft through the mobile bearing in the direction of the knife head is deliberately obtained by means of heating/cooling so that the distance between the die plate and the rotating knives can be set very precisely and within the My range. In the case of a follow shaft made of steel and with a length of 20 to 30 cm, for example, the thermal extension amounts to 2 to 3 My when changing the shaft temperature by 1° C. The distance between the rotating knives and the die plate should preferably amount to 50 to 150 My and can be exactly maintained by the apparatus according to the invention.

For adjusting the pelletizer, the cutting knives are moved against the die plate at a given pressure, and then moved backwards to a preselected distance by means of heating/cooling of the hollow shaft.

The heating/cooling of the shaft can be carried out by means of a circulating heating/cooling agent such as water, oil, etc., or by means of an electrical heating of the shaft. It is important that the shaft is arranged in a mobile bearing on the knife side so as to ensure that the shaft extends in this direction only.

BRIEF DESCRIPTION OF THE DRAWINGS

Exemplary embodiments of the invention are shown in the drawings, in which:

FIG. 1 is a longitudinal sectional view of the pelletizer and part of the extruder, FIG. 2 is a sectional view taken on line 2—2 of FIG. 1 showing in more detail the cutting knife including the knife holder.

DETAILED DESCRIPTION OF THE PREFERRED EMBODIMENTS

Figure 3:
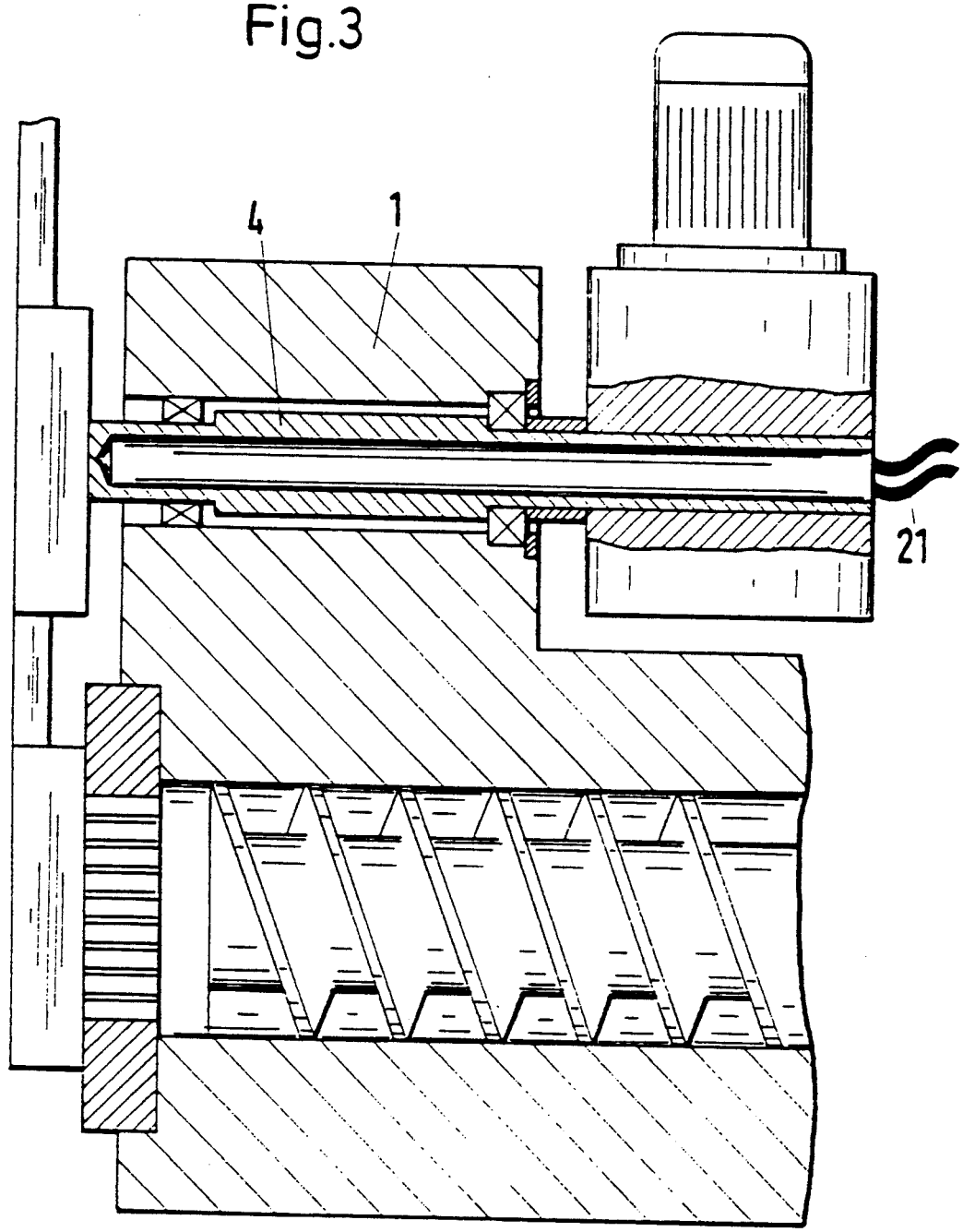
FIG. 3 is a view similar to FIG. 1 but showing another embodiment of the invention having an electrically heated shaft.

The pelletizer 1 shown in FIG. 1 is flanged to the housing 2 of the extruder. The extruder comprises a conveying screw 3 which is rotated by a drive that is conventional and accordingly has not been illustrated.

A knife beam holder 5 in the form of a disk is mounted on the knife shaft 4 and has the knife beams 6 fixed to it. The knife holders 7 are arranged on one end of the knife beams 6. The cutting knives 8 are shown in FIG. 2.

The knife holders 7 are provided on one side with a pneumatic cylinder chamber 9 with a snap closure opening 10 for connecting a pneumatic line. The cutting knife can be locked in the knife holder by means of a locking screw 11 at any axial point without the position of the knife being changed by the rotation.

The pelletizer functions as follows. Plasticized material is pressed through the holes of the die plate 12 by means of the screw and is cut into pellets by the cutting knives 8 when leaving the holes. The knife shaft 4 is designed as a hollow shaft and is internally provided with an additional coaxial pipe 13 which is parallel to the axis of the screw 3, so that the heating/cooling agent flows through the shaft around the pipe, and returns through the coaxial pipe, as shown by arrows in FIG. 1.

The shaft is provided with a mobile bearing 14 on the knife side and a stationary bearing 15 on the opposite side. The shaft 4 is put into rotation by means of a drive consisting of the gear unit 16 and the motor 17 so that the cutting knives 8 rotate in front of the die plate 12.

The distance "X" between the die plate 12 and the cutting knives 8 is adjusted as follows. At first, a compressed air source is connected to the snap closure opening 10. Afterwards, compressed air of approximately 3 bar is supplied into the pneumatic cylinder chamber 9 thus pressing the cutting knife 8 against the die plate 12 with the corresponding pressure. The cutting knife is then locked in this position by means of the locking screw 11, and the compressed air hose is loosened. Afterwards, the next knife (not depicted), which is of the same design and fixed at the second knife beam 18, is moved in front of the die plate 12. A compressed air source is again connected to the snap closure opening 10, and the cutting knife 8 is pressed with a pressure of 3 bar against the die plate 12 and fixed in this position by means of the locking screw 11. If there are further knife beams with cutting knives, they are fixed in the same way and in the same position, and the knife beam holder 5 is turned again until all cutting knives are fixed, with their distance from the die plate 12 being zero.

A heating/cooling unit (conventional and accordingly not shown) allowing an exact temperature control transports the heating/cooling agent through the openings 19 into the shaft 4 around the pipe 13. At the shaft end, the liquid flows back through the pipe 13 coaxially arranged within the hollow shaft 4, leaving the opening 20 for flow back to the heating/cooling unit. A heating/cooling circuit is thus produced which ensures an exact temperature control and thus an exact control of the extension of the shaft 4.

The extension of the shaft 4 ensures a precise adjustment of the distance "X" between the die plate 12 and the cutting knives 8. Since the distance "X" is exactly the same for all rotating knives, the knife beams, which have knives 8 fixed to them and are mounted to the knife beam holder 5, are uniformly displaced by the extension of the shaft 4.

Given a temperature difference of 100° C., the adjustable distance between the knives and the die plate amounts to 300 to 600 My for a shaft 4 made of steel, brass, or aluminium and with a length of 30 cm. It can thus be deduced that a temperature difference of 1° C. causes the length of the shaft 4 to change by 3 to 6 My. If the distance "X" is to amount to 50 My, for example, the shaft temperature must be increased by 17° and/or 34° C. and maintained at this value.

In the embodiment shown in FIG. 3, an electrical heating unit, for example, a heating cartridge, is mounted in the shaft 4 and connected to a current source via cable 21. Thus, an exact temperature control of the shaft 4, and consequently a precisely calculated change in length of the shaft 4, is possible.

Since the shaft 4 is mounted on the knife side in a mobile bearing 14 and in a stationary bearing 15 at the opposite end, the shaft is extended in the direction of the knife head, which means that it is possible to adjust the distance "X" very precisely.

What is claimed is:

1. A pelletizer for pelletizing rubber or thermoplastic material discharged by a conveying screw from an extruder, comprising:

a die plate mounted at a discharge end of the extruder outwardly of the conveying screw, said die plate having an outer face;

a knife shaft mounted parallel to and spaced from the conveying screw, and drive means spaced rearwardly from said discharge end of said extruder for rotating said knife shaft;

a stationary bearing for supporting said knife shaft adjacent said drive means, and a mobile bearing for supporting said knife shaft at an outer end thereof adjacent the discharge end of the extruder, means for heating and cooling said shaft to permit linear expansion and contraction of said shaft through said mobile bearing;

a knife beam holder mounted on the outer end of said shaft for rotation with said shaft;

a plurality of knife beams mounted in spaced relation on said knife beam holder, said knife beams carrying cutting knives which rotate closely adjacent and across the outer face of said die plate so as to cut the stands extruded through said die plate into short pieces or pellets, with the spacing of said cutting knives form the outer face of said die plate being controlled by the linear position of said shaft which is in turn controlled by said heating and cooling means.

2. The pelletizer as claimed in claim 1, wherein said knife shaft is hollow, and a pipe mounted coaxially within said shaft and spaced therefrom whereby a heating/cooling agent supplied by sad heating and cooling means can circulate through and around said pipe.

3. The pelletizer as claimed in claim 1, wherein said knife shaft is hollow, and wherein said heating and cooling means comprises an electrical heating unit positioned in said hollow shaft by means of which said shaft can be expanded or contracted to adjust the spacing of the cutting knives from the outer face of the die plate.

4. The pelletizer of claim 1, wherein said knife shaft in selected from any one of the materials steel, brass and aluminum.

5. The pelletizer of claim 1, wherein said each of said cutting knives is mounted in knife holders mounted on an associated knife beam, said knife holders being constructed so as to receive a pneumatic line so as to deliver to said knife holder and said knife mounted therein air under pressure whereby said knife can be axially adjusted so as to press against said die plate with a predetermined pressure, and means for locking said knife in an axially adjusted position.

* * * * *